United States Patent
Williams

(10) Patent No.: US 6,318,350 B1
(45) Date of Patent: Nov. 20, 2001

(54) REMOTE CONTROLLED MOCK BIRD LAUNCHER

(75) Inventor: Matthew R. Williams, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 0 days.

(21) Appl. No.: 09/369,015

(22) Filed: Aug. 5, 1999

(51) Int. Cl.[7] ................................................. F41B 11/00
(52) U.S. Cl. ................................. 124/71; 124/73; 124/75
(58) Field of Search ................................ 124/71, 1, 59, 124/73, 77; 102/342, 361, 37.8; 446/475

(56) References Cited

U.S. PATENT DOCUMENTS

| | | | |
|---|---|---|---|
| 278,005 | * | 5/1883 | Fredericks et al. . |
| 399,882 | * | 3/1889 | Graydon . |
| 502,759 | * | 8/1893 | Rapieff . |
| 1,478,597 | | 12/1923 | Bebler . |
| 3,304,928 | | 2/1967 | Darrell ................................. 124/47 |
| 3,336,870 | * | 8/1967 | Gunyan et al. . |
| 3,621,828 | | 11/1971 | Hansen ................................. 124/8 |
| 3,628,416 | * | 12/1971 | Kernan . |
| 3,752,082 | * | 8/1973 | Kernan . |
| 3,827,360 | * | 8/1974 | Geimer . |
| 4,706,641 | | 11/1987 | Cote et al. ............................ 124/8 |
| 5,133,330 | * | 7/1992 | Sharp . |
| 5,259,360 | | 11/1993 | Panara et al. ........................ 124/50 |
| 5,282,455 | | 2/1994 | Adamson et al. .................... 124/59 |
| 5,339,741 | * | 8/1994 | Craven et al. . |
| 5,415,152 | | 5/1995 | Adamson et al. .................... 124/59 |
| 5,429,053 | * | 7/1995 | Walker . |
| 5,529,527 | * | 6/1996 | Watkins . |
| 5,596,978 | * | 1/1997 | Johnson et al. . |
| 5,724,955 | | 3/1998 | Johnson et al. ..................... 124/72 |
| 5,739,462 | * | 4/1998 | Poor et al. . |
| 5,803,791 | * | 9/1998 | Chiles . |

* cited by examiner

*Primary Examiner*—Charles T. Jordan
*Assistant Examiner*—Troy Chambers
(74) *Attorney, Agent, or Firm*—Taylor & Aust, P.C.

(57) ABSTRACT

An automatic, pneumatic mock bird launcher is able to launch a plurality of mock birds utilizing compressed air from a location remote from the user/trainer. An RF link between a transmitter carried by the trainer and a receiver mounted onto the launcher and in communication therewith relays command signals from the trainer to the launcher. The launcher utilizes a rotating carousel that holds a plurality of mock birds ready for launching. Upon receipt of a command signal the launcher fires a mock bird into the air. This allows the trainer the opportunity to train a bird dog without the constant interruption of repeatedly loading the launcher. An air pressure adjustment feature allows the mock birds to be launched to varying heights. The launch elevation of the mock birds is also adjustable. The combination of adjustments to the air pressure and elevation results in varying heights and distances for the mock birds.

17 Claims, 15 Drawing Sheets

REMOTE CONTROLLED MOCK BIRD LAUNCHER

BACKGROUND OF THE INVENTION

1. Field of the Invention

The present invention relates to devices for launching a mock bird into the air in order to assist in bird-dog training and, more particularly, to an automatic, remotely controlled mock bird launching device to assist in bird-dog training.

2. Description of the Related Art

In the sport of hunting and, particularly bird hunting, dogs may be used to retrieve the bird after the bird has been shot and fallen to the ground. Such dogs are known as bird-dogs. While certain breeds of dogs are instinctively better for such work over other breeds of dogs, they still have to be trained to recognize and retrieve the fallen bird.

Mock birds, dummy birds or bumpers as they are known in the art, may be used in training bird-dogs. Such mock birds are generally a padded, cloth covered bag of various sizes. The mock birds can be treated with various bird scents in order to simulate a particular type of fallen bird. Scented or not, the mock birds are thrown or launched into the air in order to fall to the ground, thus simulating a shot bird. Once the mock bird has fallen to the ground, the bird-dog is commanded or is trained to automatically fetch or retrieve the mock bird.

While the mock birds may be manually thrown, this is awkward and not an effective method. Thus, it is known to have a mock bird launcher. However, prior art automatic launching devices for mock birds hold only one mock bird at a time and thus need to be reloaded. Therefore, each time a mock bird is to be launched, the user needs to go to the launcher and load a mock bird. Further, these devices utilize pyrotechnic solid or gaseous chemical propellants that can pose a fire and safety hazard.

What is thus needed is an automatic mock bird launching device that can hold and launch a plurality of mock birds.

What is further needed is a mock bird launching device that does not utilize pyrotechnic solid or gaseous chemical propellants.

What is even further needed is a remote controlled, automatic mock bird launching device that can be located at a point away from the user.

SUMMARY OF THE INVENTION

The present invention is directed to an apparatus and method for launching mock birds.

In one form, the present invention is a remote controlled, pneumatically operated mock bird launcher. The launcher includes a plurality of holding cylinders with each holding cylinder adapted to releasably retain a mock bird. An air valve is adapted to be coupled to a source of pressurized air and is actuatable in response to an actuation signal. A transmitter, held by the user/trainer is adapted to send an actuating signal to a receiver that is coupled to the air valve. The receiver is adapted to generate the actuation signal in response to the receipt of the actuating signal from the transmitter. An accumulation cylinder includes an inlet that is coupled to the air valve and an outlet that is adapted to be in communication with one of the holding cylinders upon the accumulation cylinder reaching a given amount of air pressure. The accumulation cylinder further includes a release valve assembly permitting release of air from within the accumulation cylinder through the outlet into one of the holding cylinders upon the accumulation cylinder reaching the given amount of air pressure to eject the mock bird from one of the holding cylinders. An indexer is coupled to the accumulation cylinder and is adapted to position one of the holding cylinders adjacent the outlet of the accumulation cylinder when the accumulation cylinder has reached the given air pressure.

The holding cylinders are preferably retained in a rotatable carousel that is coupled to the indexer. Axial movement of the accumulation cylinder upon filling with pressurized air also causes axial movement of the indexer which translates the axial movement thereof into rotational movement that rotates the carousel and positions one of the holding cylinders axially above the accumulation cylinder during each time that the accumulation cylinder fills with air. In this manner, the pressurized air within the accumulation cylinder is released into a next holding cylinder to eject the mock bird therefrom due to the air pressure.

In another form, the present invention is a mock bird launcher that holds and launches a plurality of mock birds utilizing pneumatics. The mock bird launcher includes a plurality of holding cylinders retained in a rotatable carousel with each holding cylinder adapted to releasably retain a mock bird. An air valve is adapted to be coupled to a source of pressurized air and is actuable in response to an actuation signal. An accumulation cylinder has an inlet coupled to the air valve and an outlet adapted to be in communication with one of the holding cylinders upon the accumulation cylinder reaching a given amount of air pressure. The accumulation cylinder includes a release valve assembly permitting accumulation of air within the accumulation cylinder and the release of the accumulated air from within the accumulation cylinder through the outlet into one of the holding cylinders upon the accumulation cylinder reaching the given amount of air pressure to eject the mock bird from the one of the holding cylinders. An indexer is coupled to the accumulation cylinder and the carousel and is adapted to sequentially position one of the holding cylinders adjacent the outlet of the accumulation cylinder each time the accumulation cylinder has reached the given air pressure.

The accumulation cylinder axially upwardly moves upon filling with pressurized air that also causes axial upward movement of the indexer. The indexer translates the axial upward movement thereof into rotational movement that rotates the carousel and positions one of the holding cylinders axially above the accumulation cylinder during each time that the accumulation cylinder fills with air. In this manner, the pressurized air within the accumulation cylinder is released into a next holding cylinder to eject the mock bird therefrom due to the air pressure. The now empty accumulation cylinder and the indexer move axially downward into a rest position, ready to being the sequence again.

In another form, the present invention is a method for sequentially launching a plurality of mock birds. The method includes providing a plurality of holding cylinders retained in a rotatable carousel with each holding cylinder releasably retaining a mock bird; providing an accumulation cylinder having an air inlet adapted to be coupled to a source of pressurized air, an air outlet, and a release valve assembly normally closing the air outlet with the accumulation cylinder adapted to be in communication with one of the holding cylinders with the release valve assembly releasing the accumulated pressurized air through the air outlet into the holding cylinder upon the accumulation cylinder reaching a given air pressure; providing an indexer coupled to the carousel and the accumulation cylinder with the indexer adapted to rotate the carousel and sequentially position one of the holding cylinders axially above the accumulation cylinder and the outlet of the accumulation cylinder each time the accumulation cylinder reaches the given amount of air pressure; and, providing an air valve coupled between the source of pressurized air and the air inlet of the accumulation cylinder, the air valve permitting pressurized air to flow to the accumulation cylinder upon receipt of an actuation signal.

An advantage of the present invention is that it can be operated remotely.

Another advantage of the present invention is that it can hold and launch a plurality of mock birds without reloading.

It is yet another advantage of the present invention that compressed air is used as a propellant for launching the mock birds.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

The exemplification set out herein illustrates a preferred embodiment of the invention, in one form, and such exemplification is not to be construed as limiting the scope of the invention in any manner.

DETAILED DESCRIPTION OF THE INVENTION

Figure 1:
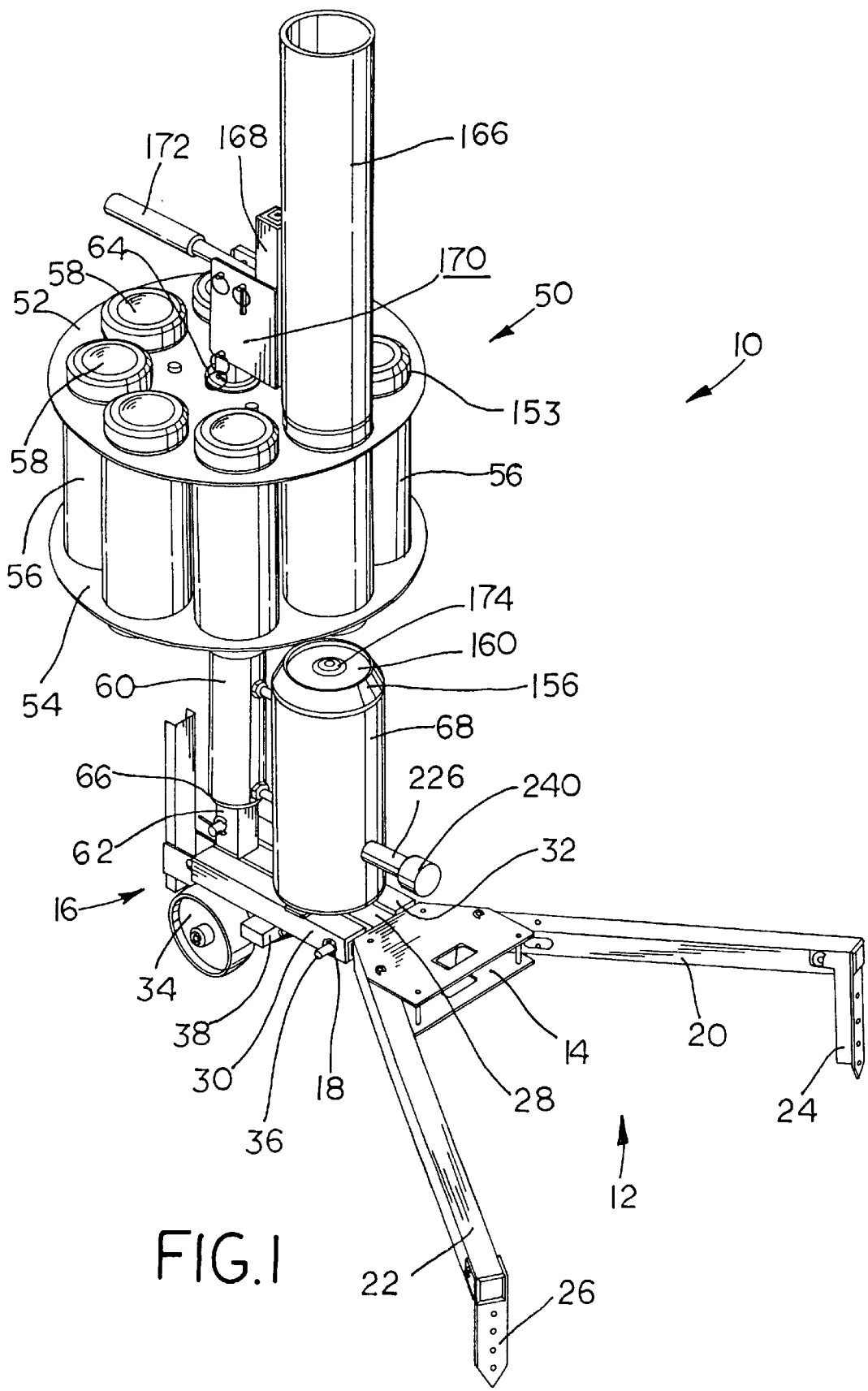
FIG. 1 is a perspective view of the present mock bird launcher.
Figure 2:
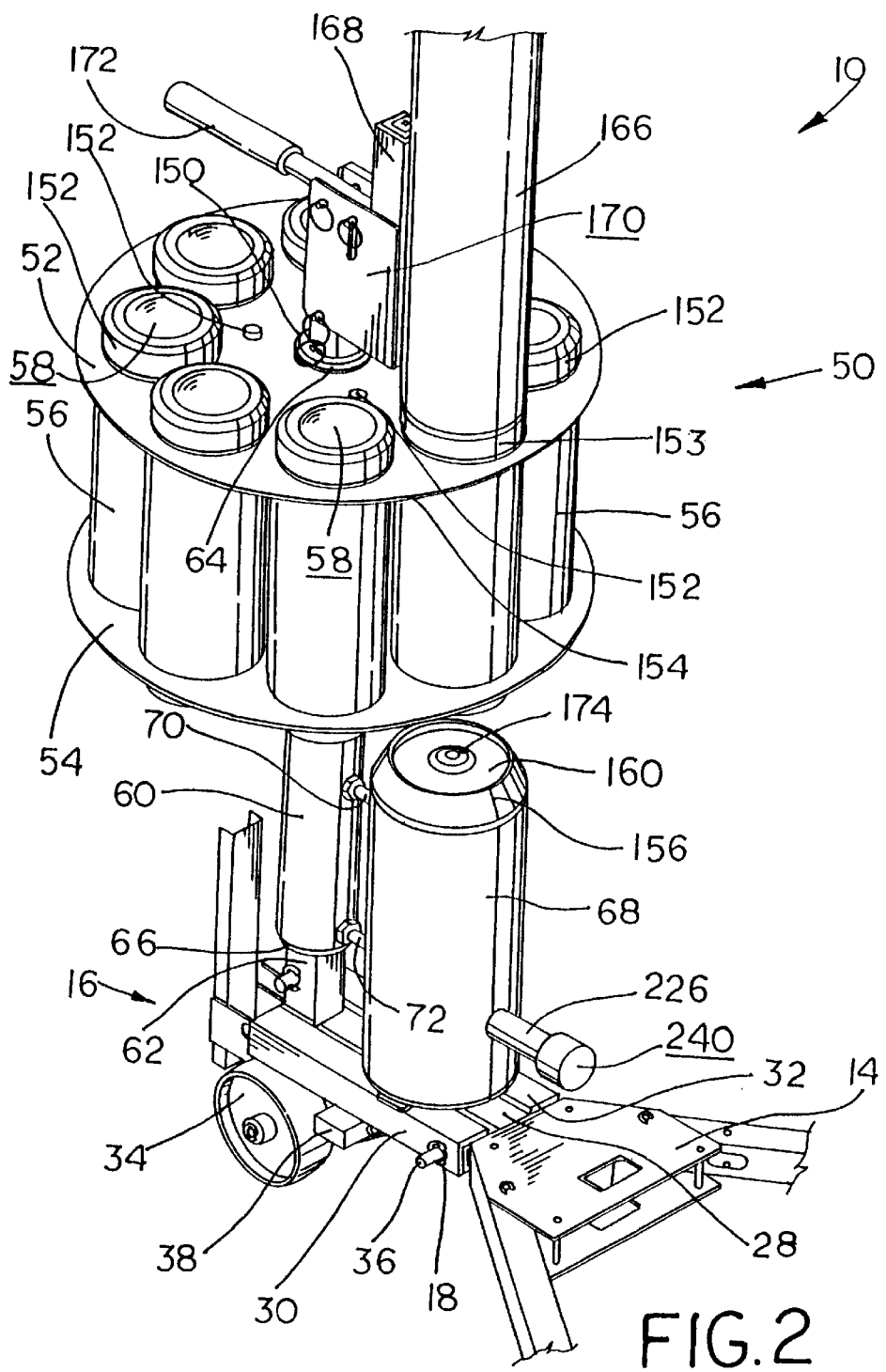
FIG. 2 is an enlarged perspective view of the launcher of FIG. 1.

Referring now to the drawings and in particular FIGS. 1 and 2, there is shown mock bird or bumper launcher 10. Mock bird launcher 10 includes stand 12 comprised of first stand portion 14 and second stand portion 16. First stand portion 14 includes legs 20 and 22 that have respective, pivotally attached stakes 24 and 26 at an end thereof. Stakes 24 and 26 allow first stand portion 14 to be fixed into the ground. First stand portion 14 also includes center bar 28 that is disposed between side bar 30 and side bar 32 of second stand portion 16. Second stand portion 16 is pivotally coupled to first stand portion 14 by pivot pin 18 which extends through side bars 30 and 32 and center bar 28. Additionally, second stand portion 16 includes wheels of which only one wheel 34 is able to be shown. This allows launcher 10 to be portable.

Figure 3:
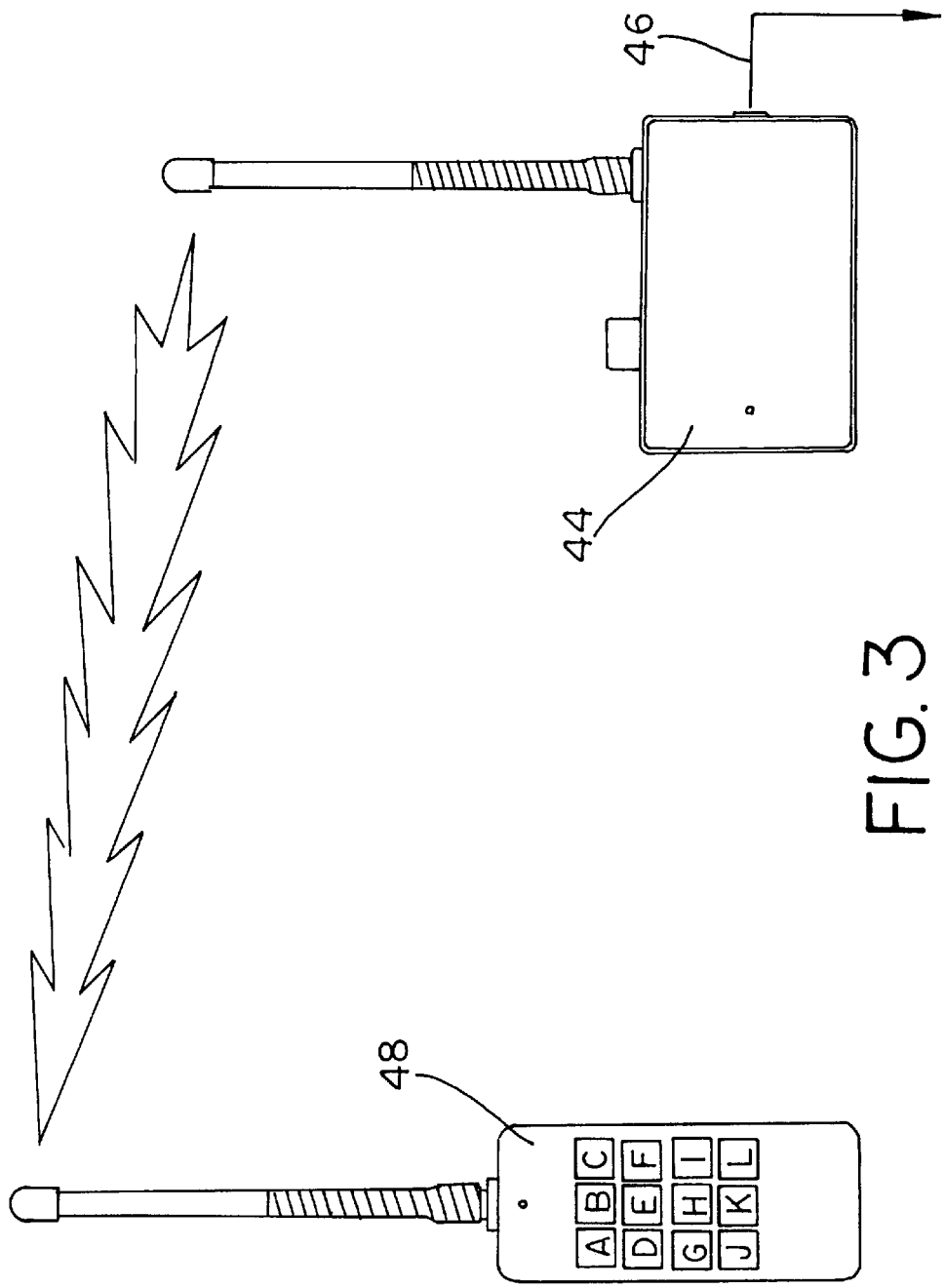
FIG. 3 is a diagrammatic view of a transmitter and receiver utilized with the launcher of FIG. 1.
Figure 4:
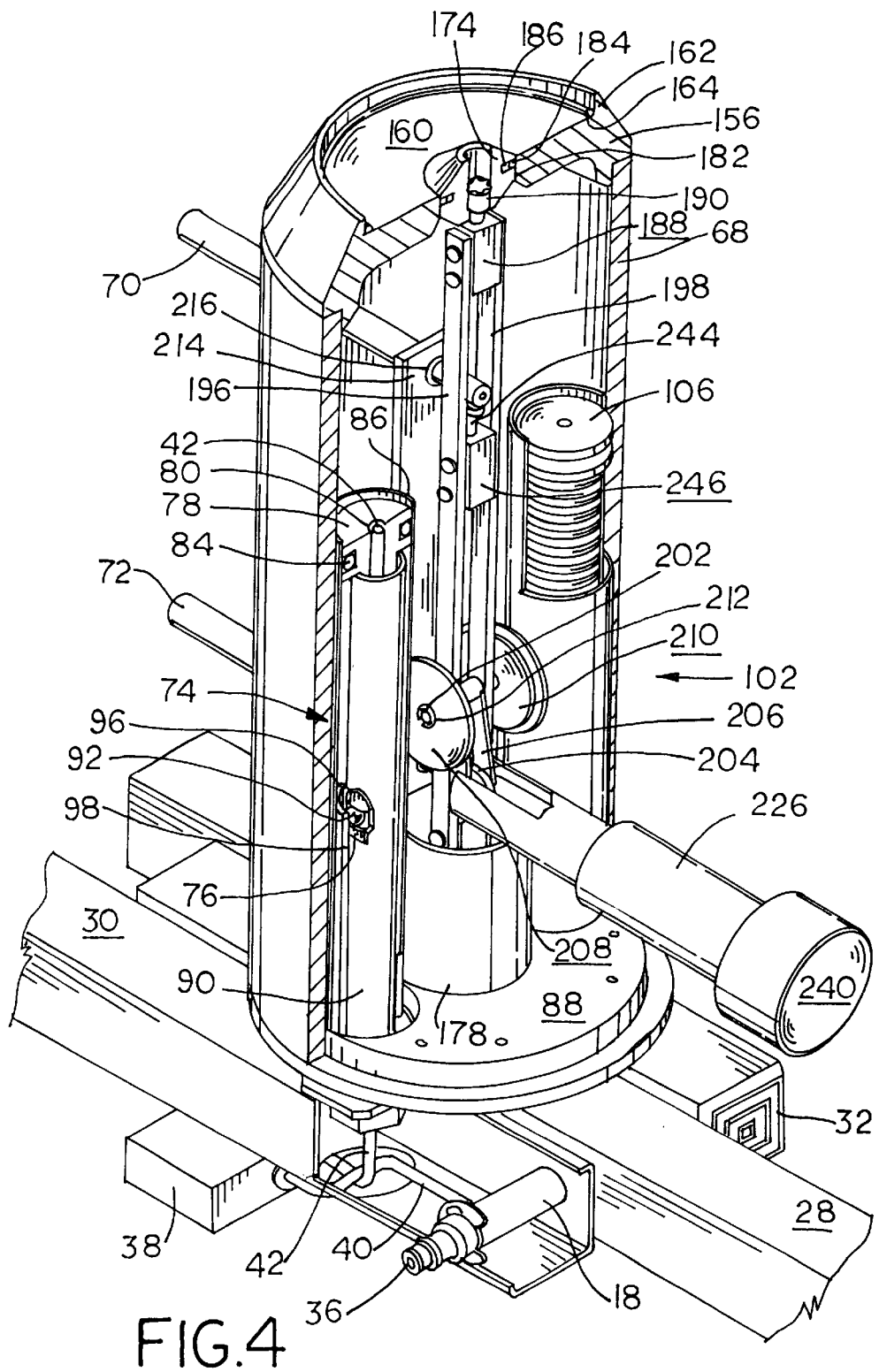
FIG. 4 is an enlarged perspective view, in partial cross-section, of the accumulation cylinder of the launcher of FIG. 1 with various internal components in partial cross-section.
Figure 5:
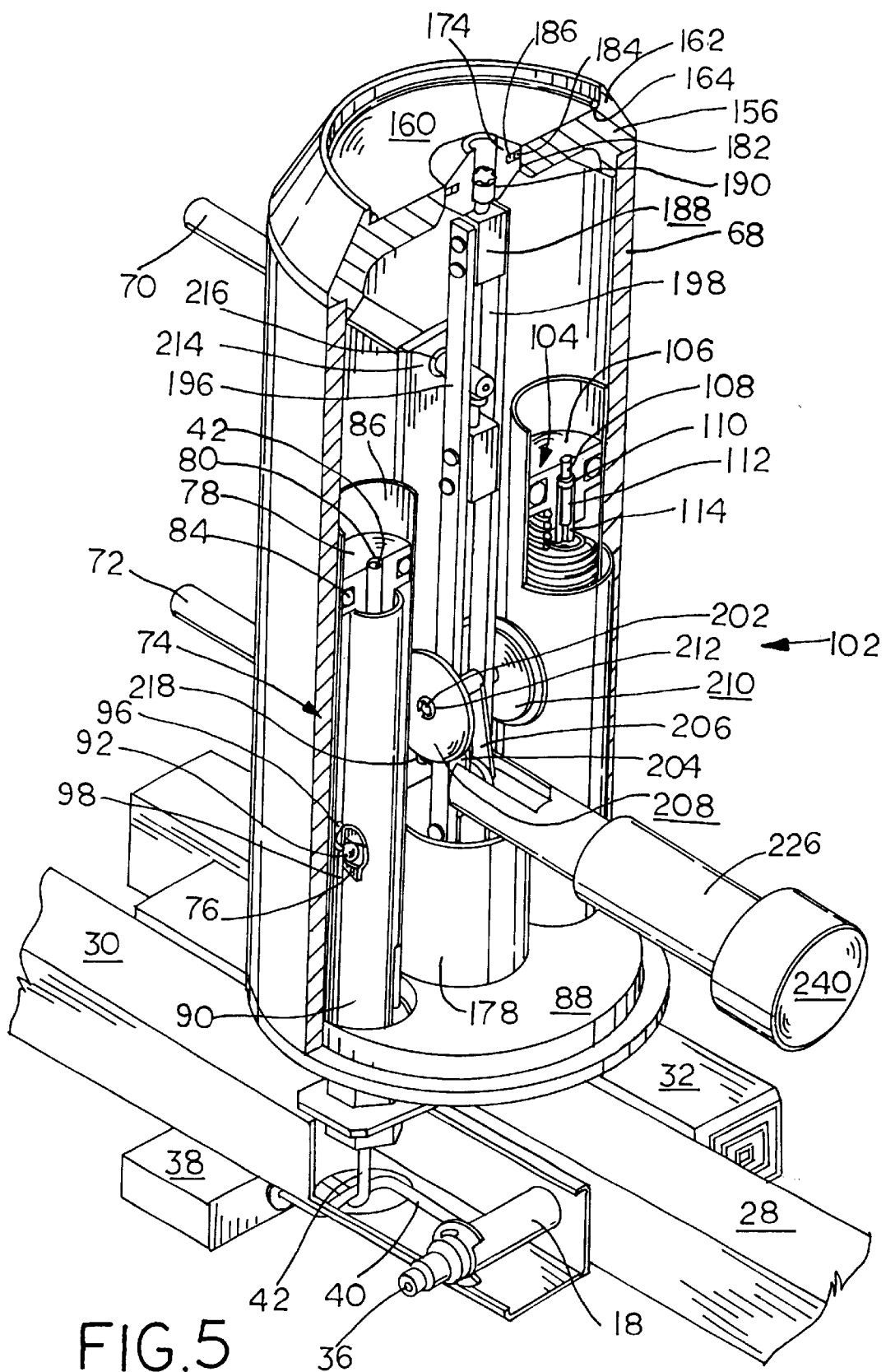
FIG. 5 is an enlarged perspective view, in partial cross-section, of the accumulation cylinder of FIG. 4 with various internal components in partial cross-section.
Figure 13:
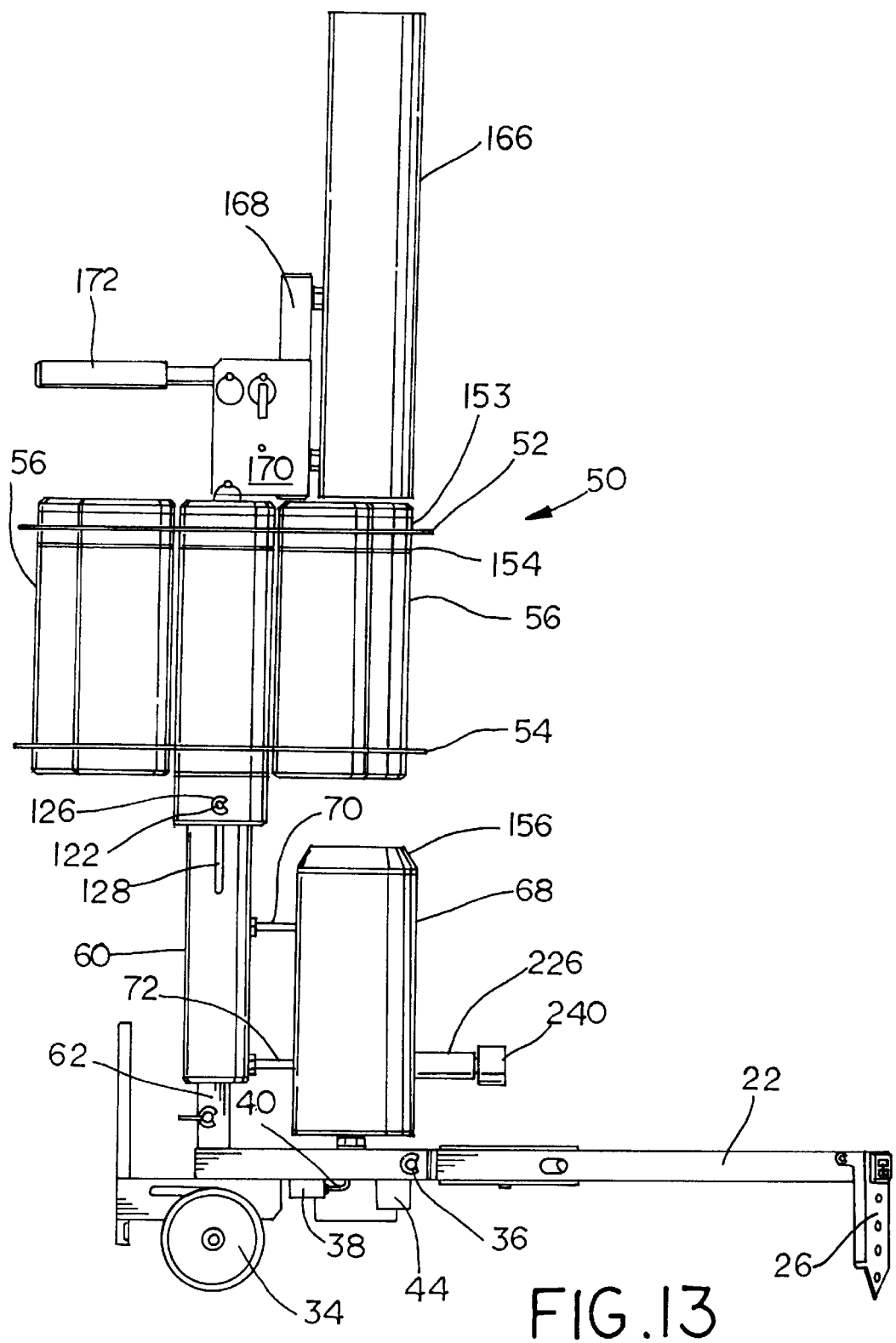
FIG. 13 is a side view of the position of the launcher of FIG. 1 prior to a launch cycle.
Figure 14:
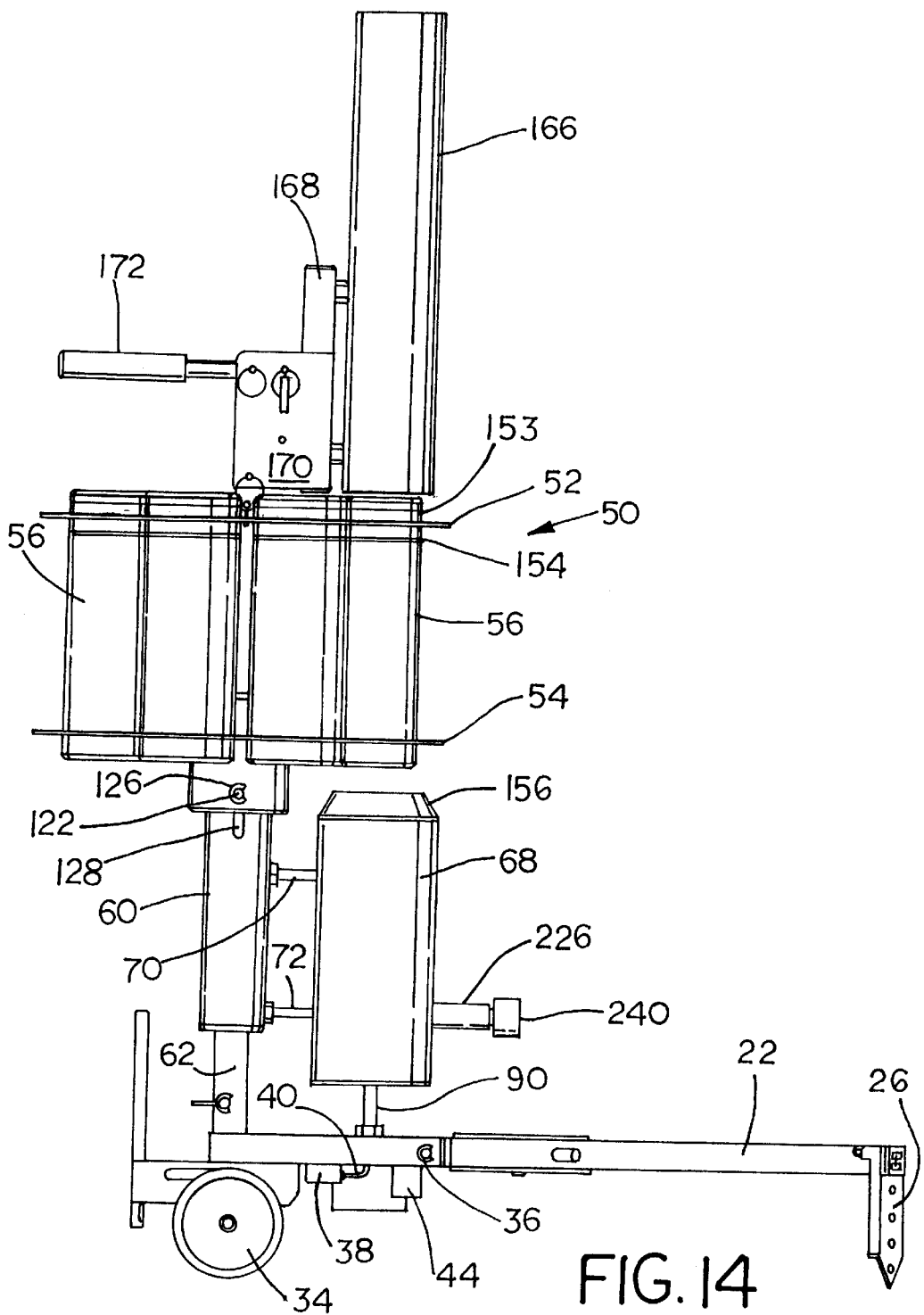
FIG. 14 is a side view of the position of the launcher of FIG. 13 during the middle of the launch cycle.
Figure 15:
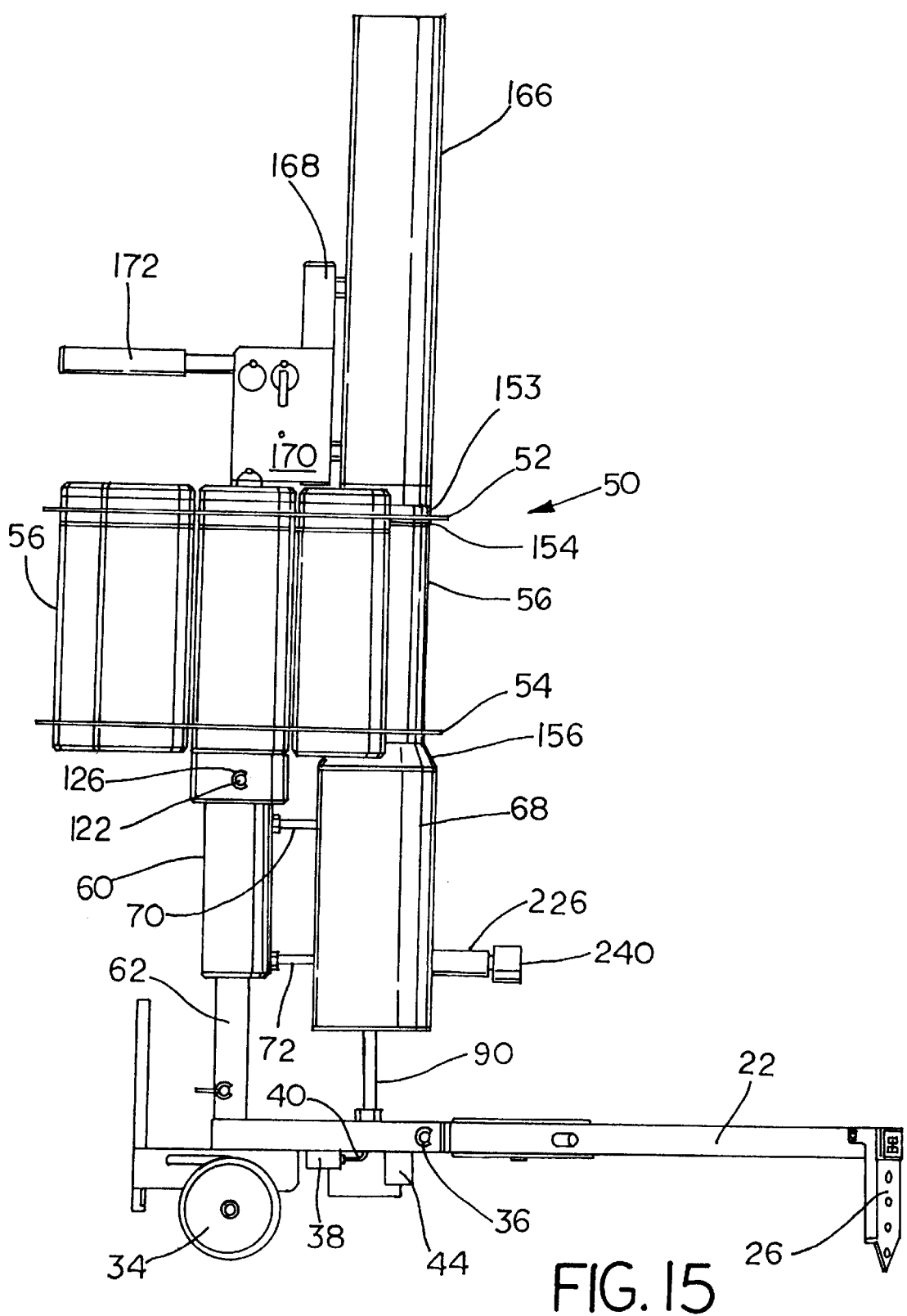
FIG. 15 is a side view of the position of the launcher of FIG. 13 during the launch of a mock bird.

In accordance with an aspect of the present invention, pivot pin 18 is machined or formed with coupling 36 on its end, such as a male plug, which is adapted to receive a mating coupling (not shown), such as a female socket, of an air conduit or hose (not shown). The air conduit is in communication with an air storage tank or compressor (not shown) for supplying compressed air to launcher 10. With additional reference to FIG. 4, pivot pin 18 is in communication with electrically actuated valve 38 via conduit 40 which is disposed within side bar 30. Thus, compressed air from the air supply tank or compressor (not shown) is supplied to valve 38 upon receipt of an actuating signal. Such an actuating signal is provided by receiver 44 as depicted in FIG. 3 via communication line 46 that is coupled between receiver 44 and valve 38. Receiver 44 is mounted to launcher 10, as schematically shown in FIGS. 13–15. Receiver 44 receives an actuation command signal via a radio frequency (RF) link from transmitter 48. Transmitter 48 is held by the user/trainer such that remote actuation of launcher 10 may be accomplished.

Referring back to FIGS. 1 and 2, launcher 10 has carousel 50 defined by upper plate 52 and lower plate 54. Each plate 52 and 54 has corresponding holes each of which supports a mock bird or bumper cylinder 56 such that each bumper cylinder 56 is limitedly, axially slidable therein. Each bumper cylinder 56 holds a mock bird or bumper 58 therein for launching. The mock birds are sized and shaped to fit snugly within the bumper cylinder yet allow ejection therefrom when actuated in accordance with the present invention. Carousel 50 is rotatively supported on indexer drive tube or cylinder 60 and center post 62 which extends upwardly from second stand portion 16. Center post 62 extends through indexer drive tube 60 and rigid O-ring 64 in a center hole in upper plate 52 such that upper plate 52 is rotatively supported thereby. Indexer drive tube 60 has lower end cap 66 that fits around and helps support indexer drive tube 60 on center post 62. Lower plate 54 is coupled to and rotated by indexer drive tube 60 as described below. Indexer drive tube 60 is attached to accumulation cylinder 68 by two adjustment rods 70 and 72 such that indexer drive tube 60 is carried upward by motion of accumulation cylinder 68. As described below, the upward motion of accumulation cylinder 68 is transferred as upward motion to indexer drive tube 60 which translates its upward motion to rotational motion thereby rotating carousel 50. In this manner, a bumper cylinder 56 containing a bumper 58 is rotated into position for launching.

Figure 6:
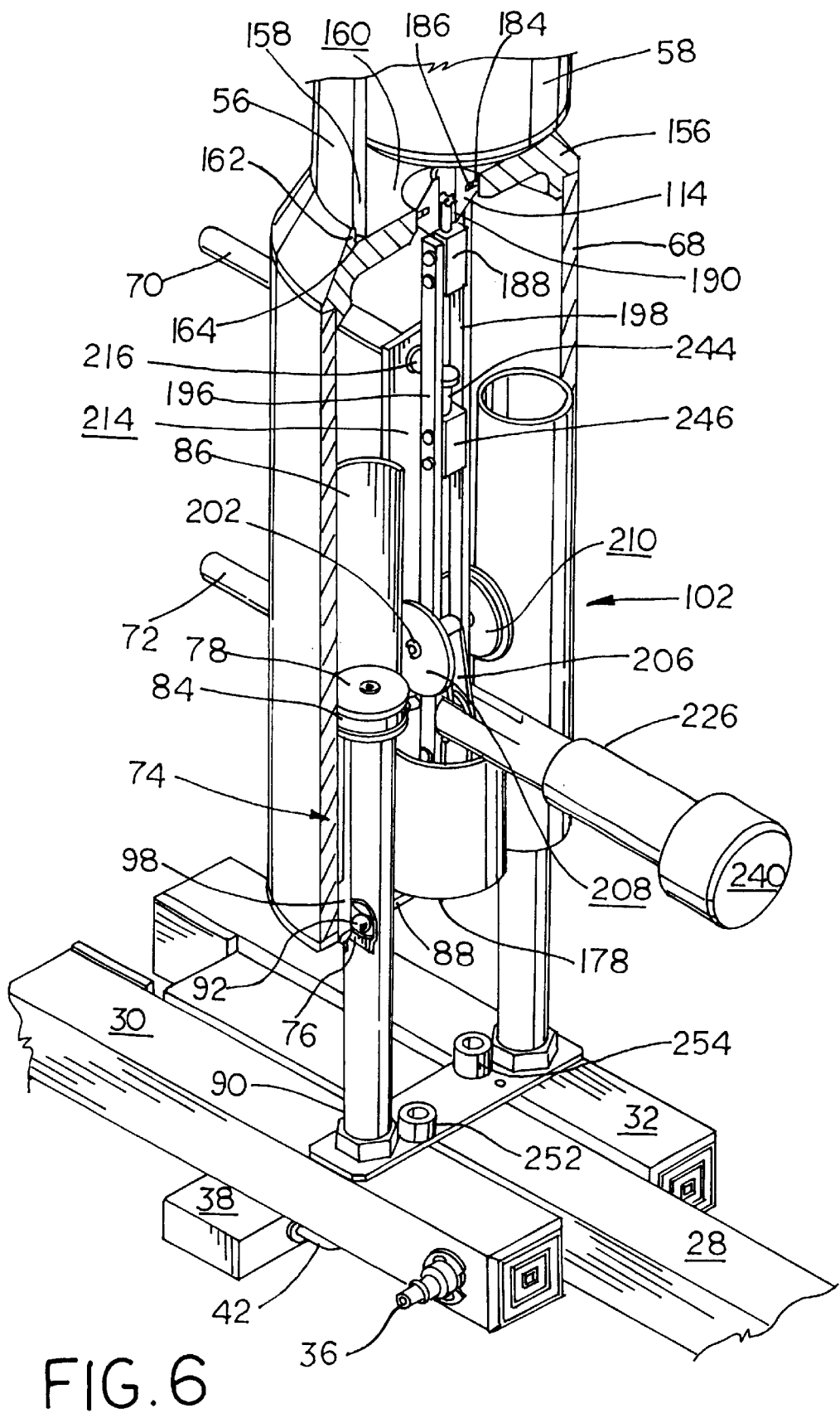
FIG. 6 is an enlarged perspective view, in partial cross-section, of the accumulation cylinder of FIG. 4 with various internal components in partial cross-section.

With additional reference to FIGS. 4–7, the operation and structure of accumulation cylinder 68 will now be described. Upon actuation of valve 38 air flows into conduit 42 which passes through the hollow center of lifting rod core tube 76 of accumulation cylinder lifting structure 74 and is sealed against lifting rod piston 78 by eyelet or gasket 80. As the air fills the interior of accumulation cylinder 68, pressure is applied to lifting rod piston 78 generating a downward force proportional to the product of the piston area and the pressure. This force acts in opposition to the force applied by compression spring 82 that has one end in contact with the underside of lifting rod piston 78. O-ring 84 is disposed about lifting rod piston 78 which provides an air seal against lifting rod cylinder 86 to prevent air leakage into lifting rod cylinder 86. Lifting rod cylinder 86 extends from base 88 of accumulation cylinder 68. A boss on the underside of lifting rod piston 78 retains actuator sleeve 90 that is disposed about lifting rod core tube 76 and inside compression spring 82. Thus, the force applied to lifting rod piston 78 is applied to actuator sleeve 90 and in turn to four steel locking balls 92 disposed in annular notch 94 of lifting core tube 76 each of which protrudes from a bore in actuator sleeve 90, with the four bores being mutually orthogonal. Initially, balls 92 are forced outwardly by the action of the bores of actuator sleeve 90 pushing balls 92 against the angled walls of notch 94. Outward travel of each ball 92 is restricted by their confinement in notches 96 and in spring sleeve 98. In this manner, relative upward motion of spring sleeve 98 with respect to lifting rod core tube 76 is prevented by action of balls 92. Any attempt to move spring sleeve 98 upwards drives balls 92 against notch 94. When sufficient force is applied to lifting rod piston 78 by the air pressure inside accumulation cylinder 68 to overcome the upward bias force against lifting rod piston 78 by compression spring 82, lifting rod piston 78 and attached actuator sleeve 90 begin to move downward. Balls 92 are then no longer pressed by the bores in actuator sleeve 90 against the upper angled surface of notch 94 in lifting rod core tube 76, but are free to move radially inward into notch 94 as actuator sleeve 90 moves downward relative to stationary core tube 76. This allows balls 92 to fit within the confines of bores in spring sleeve 98 allowing relative movement between spring sleeve 98 and core tube 76. Balls 92 continue to move downward relative to core tube 76 until they contact the lower angled surface of notch 94 of core tube 76 and are again forced radially outward until they contact the walls of the bores of spring sleeve 98. Radial motion of balls 92 ceases and the upward linear motion of spring sleeve 98 and accumulation cylinder 68, to which spring sleeve 98 is attached, continues relative to core tube 76. When actuator sleeve 90 has traveled to the point where the bores through which the balls pass reach countersink 100 of bottom or support plate 88, radial motion of balls 92 is no longer restricted by the bores of spring sleeve 98. Balls 92 move radially outward until they contact counterbore 100 of support plate 88. In this position, balls 92 prevent any downward motion of support plate 88 and accumulation cylinder 68 to which it is attached, relative to stationary core tube 76. With particular reference to FIG. 6, core tube 76 is made stationary by attachment to side bars 30 and 32 through use of standard threaded nuts or the like attached to threads on core tube 76. Any attempt to move plate 88 downward drives balls 92 against the lower angles surface of notch 94.

Disposed within accumulation cylinder 68 is second cylinder lifting structure 102. At this point, it should be understood that cylinder lifting structure 102 is structurally and operationally the same as cylinder lifting structure 69 with the exception that cylinder lifting structure 102 does not have an air conduit like air conduit 42 for supplying compressed air, but instead includes safety relief valve structure 104 to allow the release of air through bore 108 in lifting rod piston 106 should the air pressure within accumulation cylinder 68 become too great. Relief valve structure 104 comprises ball 110 sealed against a seat in lifting rod piston 106 by compression spring 112 that is contained in screw fitting 114. In this manner, ball 110 normally closes bore 108 until sufficient pressure within accumulation cylinder 68 exerts a greater pressure against compression spring 112 thereby letting the air escape through bore 108 which extends through the inner core tube of lifting structure 102.

Figure 10:
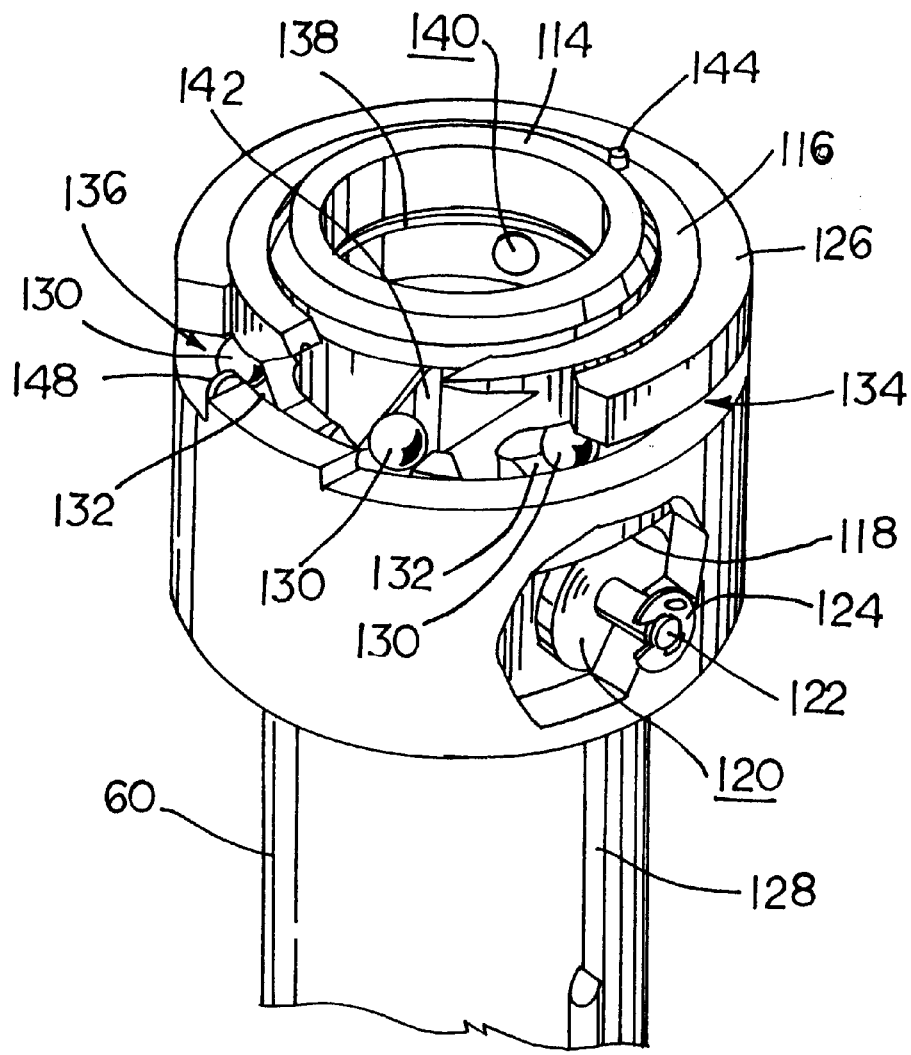
FIG. 10 is an enlarged perspective view, in partial cross-section, of the indexing mechanism of the launcher of FIG. 1 at the beginning of indexing rotation thereof.
Figure 11:
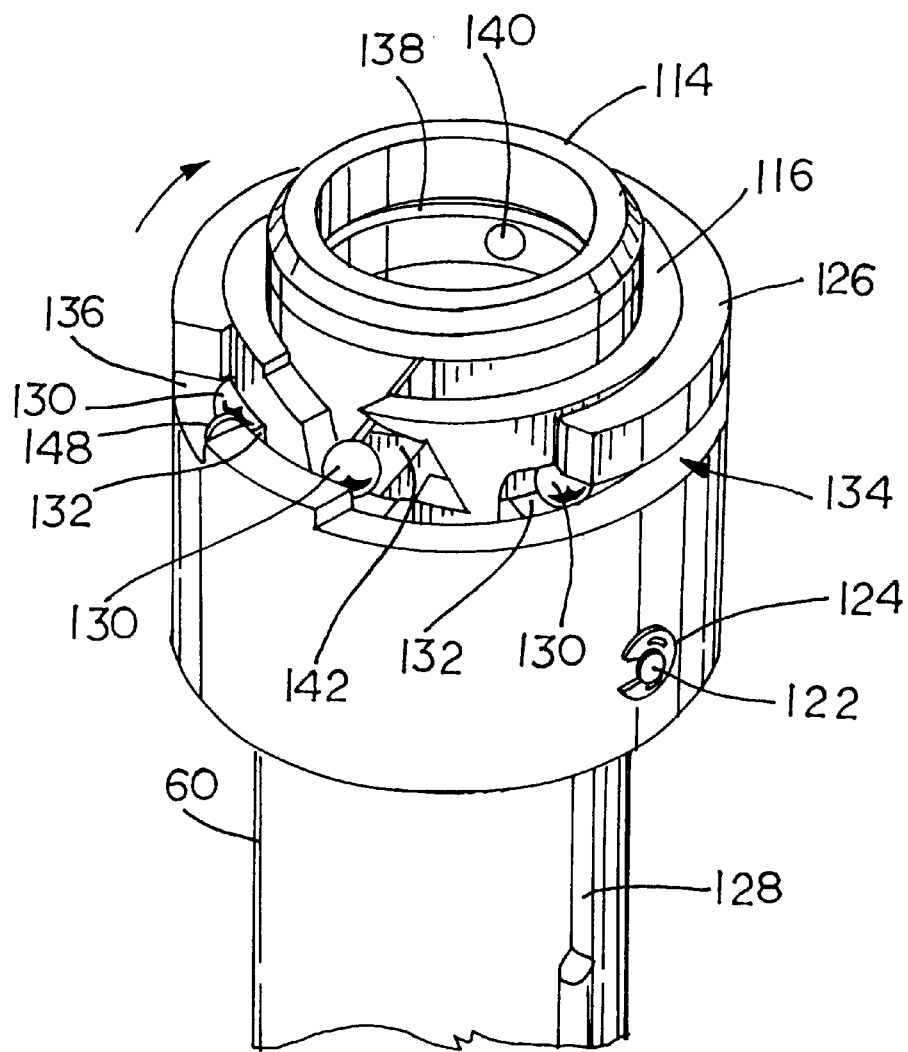
FIG. 11 is an enlarged perspective view, in partial cross-section, of the indexing mechanism of FIG. 10 at the middle of indexing rotation thereof.
Figure 12:
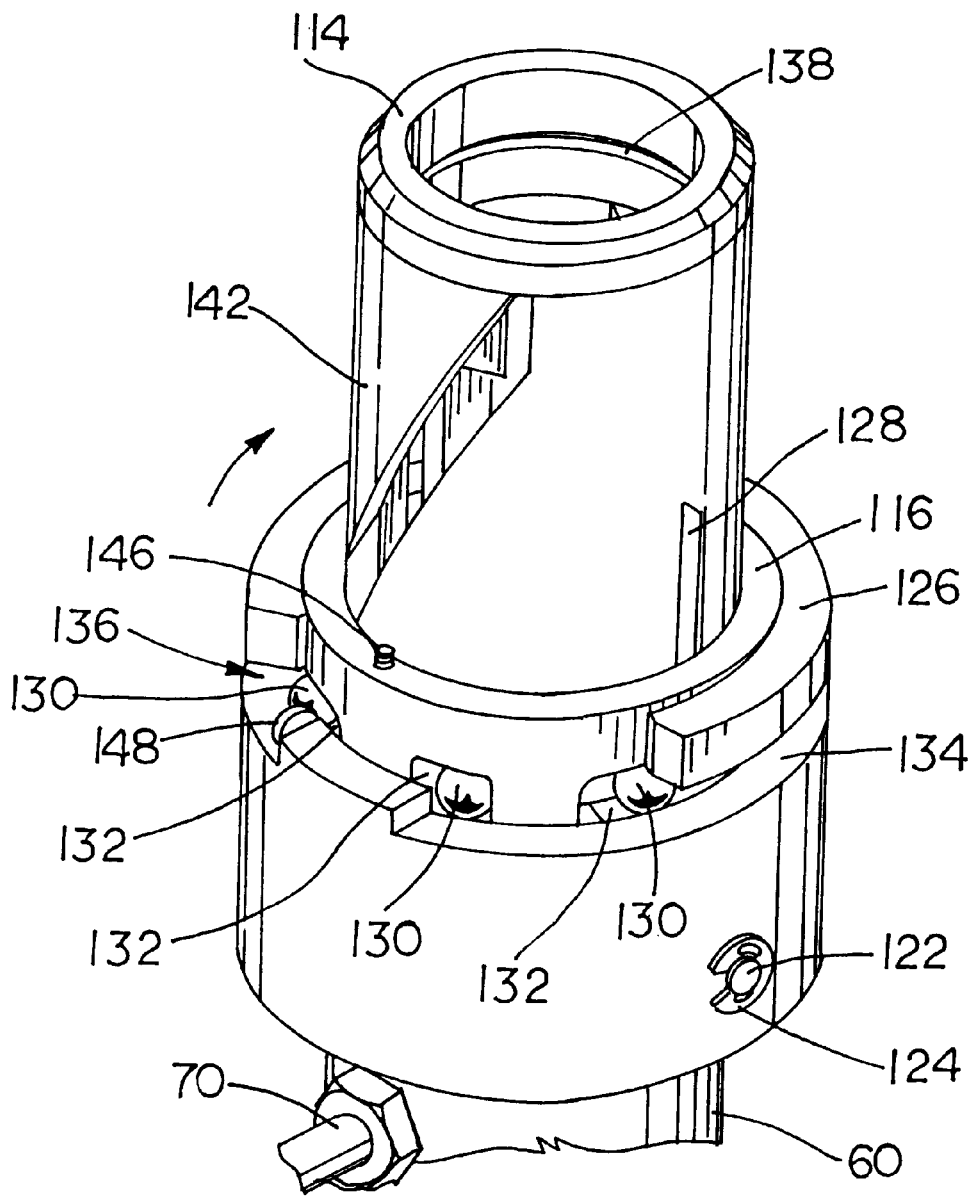
FIG. 12 is an enlarged perspective view, in partial cross-section, of the indexing mechanism of FIG. 10 at the end of indexing rotation thereof.

With additional reference to FIGS. 10–12, indexer drive tube 60 and its operation will now be described. Accumulation cylinder 68 is fixedly attached to indexer drive tube 60 by rods 70 and 72 such that as accumulation cylinder 68 axially moves when accumulation cylinder 68 axially moves. Indexer drive tube 60 is supported by two end caps, end cap 66 seen in FIGS. 1 and 2, and end cap 114 that are free to slide vertically on center post 62. Surrounding the top portion of indexer drive tube 60 is indexing sleeve 116 having bottom surface 118 that rests against two, diametrically opposed bearing wheels of which only one bearing wheel 120 may be seen. The bearing wheels 120 are free to rotate about bearing pin 122 which passes through diametrically opposed parallel vertical holes (not seen) in central post 62, diametrically opposed parallel vertical slots, of which only one such slot 128 is seen, in indexer drive tube 60, and two diametrically opposed holes in indexing housing 126. Bearing pin 122 is secured by clips, of which only one clip 124 is shown, on the outer surface of indexing housing 126. Balls 130, here numbering eight, are disposed in circumferential slots 132 that pass through indexing sleeve 116. Balls 130 have a diameter that is approximately one and one-half (1½) times the wall thickness of indexing sleeve 116. In this manner, balls 130 rest against the outer diameter of indexer drive tube 60 with the portion thereof that extends beyond the outer wall of indexing sleeve 116 constrained in two circumferential, parallel slots 134 and 136 that pass through indexing housing 126. The width of slots 134 and 136 are chosen to be narrower than the diameter of balls 130 to prevent the balls 130 from passing through the slots and falling out of the assembly.

Indexer drive tube 60 further includes ring 138 that is disposed in an annular counterbore within indexer drive tube 60 and includes two diametrically opposed magnets, of which only one magnet 140 may be seen. Each magnet 140 is positioned so as to be radially behind the uppermost portion of a diagonal slot, of which only one such diagonal slot 142 may be seen, extending through the wall of indexer drive tube 60. The width of each slot 142 is chosen to be narrower than the diameter of balls 130 to prevent the balls from passing through the slot and falling from the assembly. Balls 130 are made from a ferrous material so that magnets exert a pulling force thereon. During the rest state, as depicted in FIG. 10, a ball is positioned at the uppermost portion of each diagonal slot 142 and pulled radially inward by the pulling force of magnet 140. The radial depth of slots 142 is chosen so that the extremities of a ball will fall within the inner diameter of indexing housing 126 when that ball has been pulled into the respective diagonal slot by the respective magnet.

When indexer drive tube 60 is pulled upwardly by accumulation cylinder 68 after actuation of valve 38 and the filling of accumulation cylinder 68 with compressed air, indexing sleeve 116 will not move upwardly since indexing sleeve 116 is coupled to bottom plate 54 of carousel 50 by two dowel pins 144 and 146. During this upward travel of indexer drive tube 60. diagonal slots 142 exert a tangential force against the two balls 130 (driven balls) that have beer, pulled into the slots. This force causes each of the balls 130 to move tangentially in its respective slot 132 in indexing sleeve 116. When the two driven balls 130 reach the limit of their respective slot 132 by continued upward motion of indexer drive tube 60, they apply a tangential force to indexing sleeve 116 causing tangential sleeve 116 to rotate about the common axis of indexer drive tube 60, indexing sleeve 116, and indexing housing 126 (see FIG. 11). Indexing sleeve 116 continues to rotate under the action of the two driven balls as indexer drive tube 60 continues its upward motion until the balls reach the end of diagonal slots 142. The impingement of balls adjacent the driven balls upon indexing housing 126 provides a mechanical stop that prevent further rotation of indexing sleeve 116. When the driven balls have reached the limit of diagonal slots 142, two magnets, of which only one such magnet 148 may be seen, magnetically pull the driven balls radially outward out of the diagonal slot. This allows indexer drive tube 60 to continue its upward motion free from impediment by balls 130 against the limits of slots 132.

As indicated above, indexing sleeve 116 is coupled to bottom plate 54 of carousel 50. Bottom plate 54 is free to rotate about the mutual outer diameter of top-most end cap 114 and indexer drive tube 60, while top plate 52 is supported by hub 150 (see FIG. 2) which is free to rotate about center post 62 and supported by O-ring 64. Plates 52 and 54 are coupled together by tie rods 152 that are fastened to plates 52 and 54 using standard mechanical fasteners. Carousel 50 is shown with eight bumper cylinders 56 each containing a tight fitting bumper 58. Bumper cylinders 56 pass through aligned holes in plates 52 and 54. The diameter of the holes in plates 52 and 54 is chosen to be slightly larger than the outer diameter of the bumper cylinder to allow the bumper cylinders to slide vertically relative to plates 52 and 54. The vertical range of motion of each bumper cylinder 56 is restricted by upper O-ring 153 and lower O-ring 154. The depth of slots 134 of indexing housing 126 and diagonal slots 142 of indexer drive tube 60 are chosen to impart a precise angular rotation to indexing sleeve 116 to index each of the bumper cylinders 56 with accumulation cylinder 68 each time indexer drive tube 60 is moved upward by the action of accumulation cylinder 68.

With additional reference to FIG. 6, when accumulation cylinder 68 continues its upward motion, accumulation cylinder 68 reaches the bottom of the bumper cylinder aligned with it by the rotation of indexing sleeve 116. Accumulation cylinder head 156 engages bottom 158 of bumper cylinder 56. Specifically, bottom 158 of bumper cylinder 56 contacts top 160 of accumulation cylinder head 156 and fits within annular rim or lip 162. O-ring 164 is disposed on top 160 adjacent rim 162 to provide a seal between accumulation cylinder head 156 and bottom 158 of bumper cylinder 56. As accumulation cylinder 56 continues its upward motion, bumper cylinder 56 is axially upwardly displaced. This causes the top of bumper cylinder 56 to engage the bottom of stationary barrel 166. Stationary barrel 166 provides a launching tube for the bumper and is attached to barrel support post 168 that is coupled to fastening plate assembly 170 which is in turn coupled to support post 62. Adjustment handle 172 is coupled thereto to provide adjustment to stationary barrel 166. O-rings are provided in stationary barrel 166 and the top of the indexed bumper cylinder to seal the joints therebetween.

Now, with reference back to FIGS. 614 9, as air continues to fill accumulation cylinder 68, pressure is exerted against small release valve piston 174 and large release valve piston 176, exerting an outward force against both pistons. Large release valve piston 176 is free to translate within cylinder 178 which is secured to base 88 while O-ring 180 prevents air leakage around large release valve piston 176. Small release valve piston 174 is free to translate in bore 182 in top 160 of accumulation cylinder head 156. O-ring 184 prevents air leakage around piston 174 and is centered in the gland of piston 174 by compressible foam ring 186. The O-rings seals used to prevent air leakage around the pistons are preferably of the floating piston type. This type of seal design minimizes friction between the O-ring and bore by compressing only the outer diameter of the O-ring while allowing a slight clearance between the inner diameter of the O-ring and bottom of the O-ring gland.

Piston 174 is attached to piston coupling 188 by ball and socket assembly 190 while piston 176 is attached to piston coupling 192 by ball and socket assembly 194. Each ball and socket assembly 190 and 194 include a threaded ball stud confined in a counterbore in each piston with the shaft of the stud threaded into a bore in the coupling, and includes an O-ring compressed against the bottom of the counterbore by the spherical portion of the ball stud to prevent air leakage through the bore. A top retaining washer for each ball and socket assembly 190 and 194 prevents the ball stud from translating in the counterbore of the respective piston. Piston coupling 188 is riveted to one end of tie strips 196 and 198 while piston coupling 192 is riveted to the other end of tie strips 196 and 198 to form a release valve assembly. Ball and socket assemblies 190 and 194 allow for misalignment between the axes of pistons 174 and 176 respectively without causing binding of the assembly. The diameter, and corresponding area, of large release valve piston 176 is chosen to be greater than the diameter and area of small release valve piston 174 so that the net force applied to the release valve assembly by air pressure in accumulation cylinder 68 acts to move the release valve assembly downward. In a rest state, small release valve piston 174 is seated in bore 182 of top 160 while large release valve piston 176 is axially above bore 200 in base 88. Pin 202 passes through aligned holes in tie strips 196 and 198 and attaches the valve assembly to two release valve linkages 204 and 206 on the inside of tie strips 196 and 198. Two release valve bearing wheels 208 and 210 are supported by pin 202 on the outside of tie strips 196 and 198 and captured by retaining rings, of which only one such retaining ring 212 is shown, such that release valve bearing wheels 208 and 210 are free to rotate about pin 202. Bearing wheels 208 and 210 roll against track 214 which is retained onto adjustment rods 70 and 72 by retaining rings 216 and 218 respectively. In this manner, the release valve assembly is free to translate vertically but is prevented from outward horizontal motion by the action of bearing wheels 208 and 210 against track 214.

Figure 7:
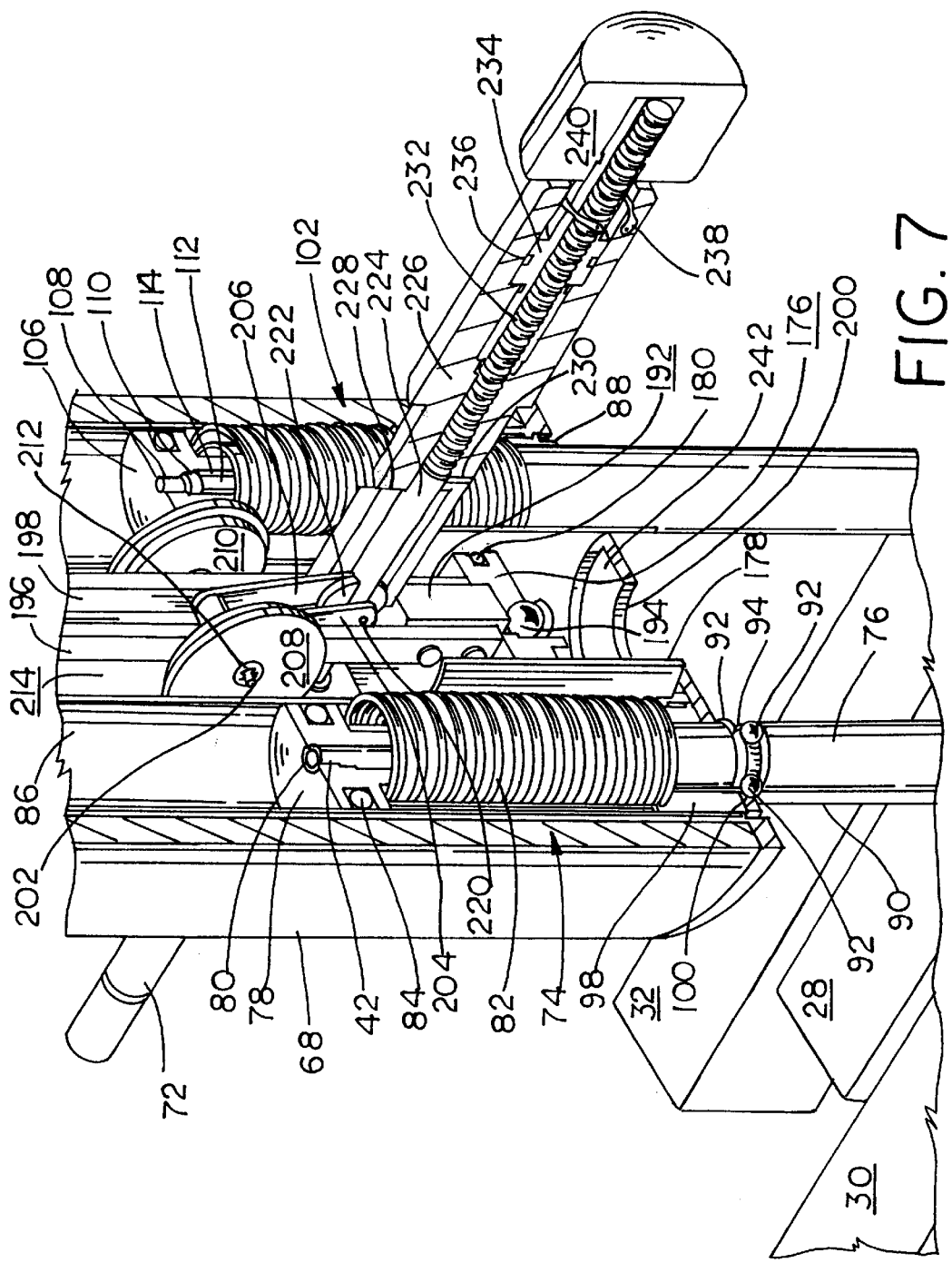
FIG. 7 is an enlarged perspective view, in partial cross-section, of a portion of the accumulation cylinder of FIG. 4 with various internal components in partial cross-section including the air pressure adjuster.
Figure 8:
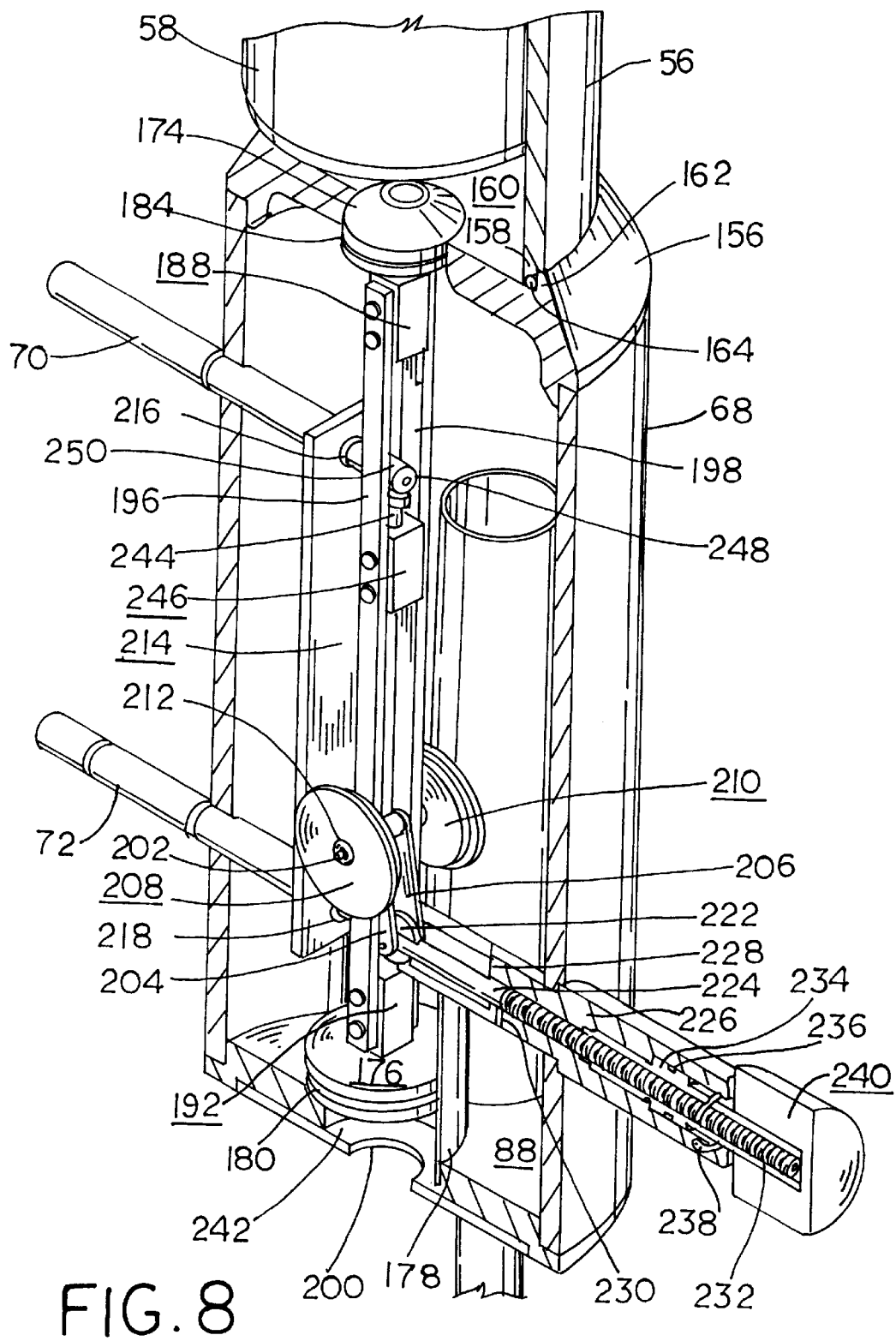
FIG. 8 is an enlarged perspective view, in partial cross-section, of the accumulation cylinder of FIG. 4 prior to the opening of the pressure relief valve.
Figure 9:
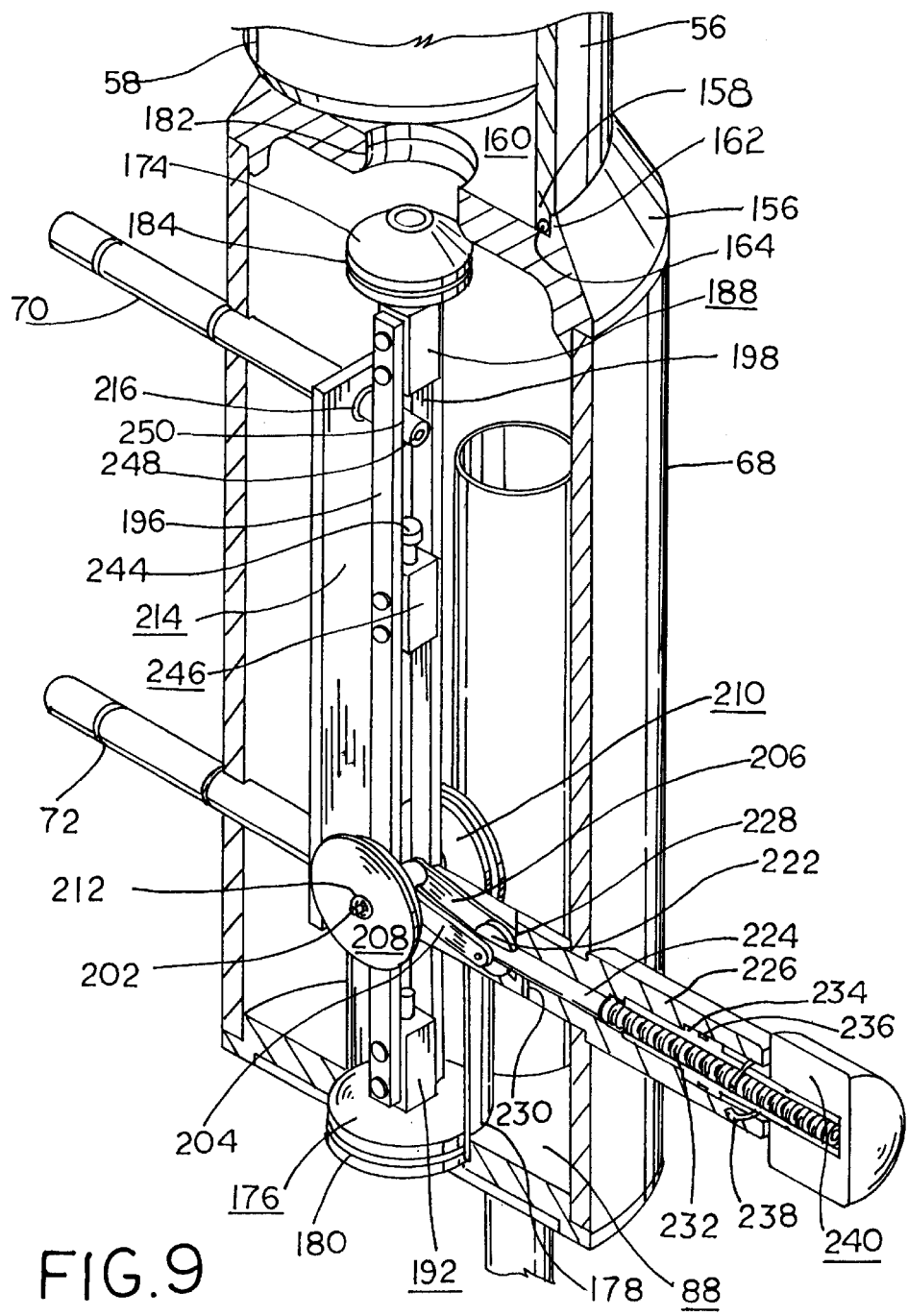
FIG. 9 is an enlarged perspective view, in partial cross-section, of the accumulation cylinder of FIG. 8 after the opening of the pressure relief valve.

With particular reference to FIGS. 7–9, extending through linkages 204 and 206 is pin 220. Pin 220 also extends through pressure adjustment wheel 222 and pressure adjustment rod 224 such that pressure adjustment wheel 222 is free to rotate about pin 222. Pressure adjustment wheel 222 is contained by the bifurcated end or slot of pressure adjustment rod 224. Dowel pin 230 provides a mechanical stop to restrict movement of rod 224 inward towards the center of accumulation cylinder 68. Partially compressed bias spring 232 is disposed within pressure adjustment housing 226 and at one end thereof, abuts push rod 224 to apply a force thereto. Spring 232 is also disposed within a bore of pressure adjustment screw 234 which is disposed within pressure adjustment housing 226. The other end of spring 232 abuts knob 240. Threaded engagement between pressure adjustment screw 234 and pressure adjustment housing 226 allows screw 232 to transverse along the longitudinal axis of pressure adjustment housing 236 as knob 240 is rotated. O-ring 236 precludes leakage of air from accumulation cylinder 68 from about screw 234 while retaining ring 238 provides a mechanical stop to limit the outward travel of screw 234. Horizontal force applied by bias spring 232 to rod 224 is converted by the linkages to an upward vertical force applied to the valve assembly. This force acts to oppose the net downward force applied to the valve assembly by air pressure acting on the differential area of valve pistons 174 and 176. The amount of horizontal force applied by bias spring 232 can be increased or decreased by rotating knob 240.

When the air pressure acting on pistons 174 and 176 of the valve assembly reaches a level sufficient to cause the downward force acting on the valve assembly to surpass the upward force applied to the valve assembly by linkages 204 and 206, the valve assembly begins to move downward. As the valve assembly moves downward, the angle from horizontal of linkages 204 and 206 decreases and rod 224 moves radially outward, further compressing bias spring 232. As the angle from horizontal of linkages 204 and 206 decreases, the horizontal component of the force that linkages 204 and 206 apply against rod 224 increases proportionally to the reciprocal of the tangent of the angle. The opposing force that bias spring 232 exerts against rod 224 is proportional to the cosign of the angle. Since the reciprocal tangent function exhibits a greater change in magnitude than the cosign function for a given change in angle, once the radial outward movement of rod 224 commences, rod 224 will continue to move requiring less and less force to be applied to linkages 204 and 206 by the valve assembly to sustain the movement. In this manner, the valve assembly, linkages 204 and 206, bias spring 232, rod 224, adjustment screw 234, adjustment housing 226, and their associated parts form an adjustable force break-over mechanism that allows the pressure that the valve opens to be adjusted by turning adjustment screw 234 by knob 240. In one form, it was found by the inventor that the initial and final angles for linkages 204 and 206 of 80° and 20°, respectively, give acceptable performance. Thus, as the valve assembly moves downward, O-ring 184 of small release valve piston 174 enters the radiused portion of bore 182. The valve assembly continues to travel downwardly until the bottom face or surface of large release valve piston 176 abuts seat 242 to close or seal opening 200 wherein O-ring 180 is compressed and movement of the valve assembly is arrested (see FIG. 9).

Pressurized air that filled accumulation cylinder 68 now flows through bore 182 and fills the volume behind bumper 58 applying a force to the base of bumper 58 and to the upper surface of top 160. The pressure against the upper surface of top 160 tries to drive accumulation cylinder 68 downwardly. However, accumulation chamber 68 is prevented from downward movement by action of locking balls 130 on indexer core tube 76 and base 88 as described above. The force from the air pressure acting on the base of bumper 58 propels bumper 58 up bumper cylinder 56 and stationary barrel 166 until bumper 58 reaches the end of stationary barrel 166 where bumper 58 exits stationary barrel 166 with appreciable velocity thereby launching bumper 58 into the air. The pressure within accumulation cylinder 68 continues to decrease as air continues to exit accumulation cylinder 68 via bore 182. As the air pressure acting on pistons 174 and 176 decreases to approximately $\frac{1}{20}^{th}$ of its initial value, the downward force acting on the valve assembly becomes less than the upward force applied to the valve assembly by bias spring 232 acting against rod 224 and linkages 204 and 206. The valve assembly moves upward to its original, rest position wherein small release valve piston 174 seats within bore 182 and large release valve piston 176 unseats to open bore 200. O-ring 184 of piston 174 is kept centered by foam ring 186 to preclude twisting and binding of O-ring 184 as piston 174 enters the radiused portion of bore 182 and radial compression of O-ring 184 occurs.

Upward motion of the valve assembly is limited by a mechanical stop consisting of screw 244 threaded into coupling block 246 contacting O-ring 248 on dowel pin 250 at the end of adjustment rod 70. Coupling block 246 is riveted to tie rods 196 and 198. When the force applied to lifting rod piston 78 by air pressure in accumulation cylinder 68 decreases to the level where it can no longer overcome the upward bias force against lifting rod piston 78 exerted by compression spring 82, lifting rod piston 78 and attached actuator sleeve 90 are pushed upward by compression spring 82. This allows the locking balls 92 to move radially inward and fit within the confines of notch 94 machined into core tube 76, allowing relative movement between the spring sleeve 98 and core tube 76. Balls 92 continue to move upward relative to core tube 76 until they contact the upper angled surface of notch 94 and are again forced radially outward until they contact the wall of the thru-bore. Radial motion of balls 92 ceases and the downward translation of spring sleeve 98 and accumulation cylinder 68, under the influence of expanding spring 82, continues relative to core tube 76. When actuator sleeve 90 has traveled to the point where the bores through which balls 92 pass reach the end of the thru-bores of spring sleeve 98, radial motion of balls 92 is no longer restricted by the thru-bores of spring sleeve 98. Balls 92 move radially outward until they contact the wall of notch 94 and spring sleeve 98, and relative upward motion of spring sleeve 98 with respect to core tube 76 is once again prevented by action of balls 92. Of course, it should be understood that lifting assembly 102 experiences the same conditions and functions the same as lifting assembly 74.

At this point, accumulation cylinder 68 and attached indexer drive tube 60 continue their downward travel until base 88 contacts bumpers 252 and 254 (see FIG. 6). The force exerted on balls 130 by magnets 148 (see FIGS. 10–12) prevents the balls from re-entering diagonal slots 142 in indexer drive tube 60 as they pass by the balls. Magnets 148 thus prevent indexing sleeve 116 from rotating backwards. Launcher 10 is ready to begin the sequence again when another bumper is to be launched.

With reference to FIGS. 13–15, a simplified version of the bumper launch sequence will be described. When the trainer inputs a command into transmitter 48, receiver 44 receives a signal from transmitter 48 and sends a signal via line 46 to actuate valve 38. Actuation of valve 38 allows air to flow from an air compressor or tank (not shown), through valve 38 and into accumulation cylinder 68. At the rest state, as depicted in FIG. 13, accumulation cylinder 68 and thus indexer drive tube 60 are in a downward position. As accumulation cylinder 68 fills with the compressed air as described above, accumulation cylinder 68 begins to travel upwardly as depicted in FIG. 14. Upward motion of accumulation cylinder 68 causes upward motion of indexer drive tube 60 on center post 62 since indexer drive tube 60 is coupled to accumulation cylinder 68 by rods 70 and 72. The upward motion of indexer drive tube 60 causes the indexer mechanism including indexing sleeve 116 to rotate carousel 50 in order to align a bumper cylinder 56 between accumulation cylinder 68 and barrel 166 for launching bumper 58 contained within bumper cylinder 56. Continued upward motion of accumulation cylinder 68 by compressed air entering therein causes accumulation head 156 of accumulation cylinder 68 to abut the underside of bumper cylinder 56, which by this time has been rotated into position by indexer drive tube 60 as depicted in FIG. 15. Accumulation cylinder 68 axially upwardly moves bumper cylinder 56 which, like all of the bumper cylinders, is loosely retained by upper and lower plates 52 and 54 and whose axial travel both in an upward and downward sense is limited by O-rings 153 and 154. The top of bumper cylinder 56 engages the bottom of barrel 166 and is sealed by various O-rings as described above. At this point, the valve mechanism within accumulation cylinder 68 closes the bottom hole or port in accumulation cylinder 68 while opening the upper hole or port in accumulation cylinder 68 to allow the compressed air contained within accumulation cylinder 68 to escape into bumper cylinder 56. The bumper contained within bumper cylinder 56 is launched into barrel 166 by the accumulating air pressure. The air pressure is adjustable through knob 240 as described above.

After launching of the bumper, the air pressure within accumulation cylinder 68 is reduced allowing the valve mechanism therein to close the upper hole and open the lower hole. Accumulation cylinder 68 thus travels downwardly, bringing indexer drive tube 60 downwardly Indexer drive tube 60 does not further rotate carousel 50 until the next upward travel thereof.

It should be understood that while carousel 50 is shown having eight (8) bumper cylinders, practically any number of bumper cylinders may be held by the carousel. Further, multiple launching devices may be used wherein the transmitter can send signals to launch a bumper from any launching device. In this manner, one launching device may be set to launch a bumper to a particular distance and height, while another launching device may be set to launch a bumper to a different distance and height. The supply of compressed air may be coupled to all of the launching devices or each launching device may be coupled to its own source of compressed air.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A launching device for mock birds comprising:
 a plurality of holding cylinders, each holding cylinder adapted to releasably retain a mock bird;
 an air valve adapted to be coupled to a source of pressurized air and actuable in response to an actuation signal;
 a transmitter adapted to send a control signal;
 a receiver coupled to said air valve and adapted to receive said control signal and generate said actuation signal in response thereto;
 an accumulation cylinder having an inlet coupled to said air valve and an outlet adapted to be in communication with one of said holding cylinders proximal said accumulation cylinder reaching a given amount of air pressure, said accumulation cylinder having a release valve assembly permitting release of air from within said accumulation cylinder through said outlet into one of said holding cylinders upon said accumulation cylinder reaching said given amount of air pressure to eject the mock bird from the one of said holding cylinders;
 an indexer coupled to said accumulation cylinder and adapted to position one of said holding cylinders adjacent said outlet of said accumulation cylinder; and
 wherein air pressure accumulating in said accumulation cylinder causes upward movement of said accumulation cylinder and said indexer, said indexer translating upward movement thereof to rotational movement of said carousel.

2. The launching device of claim 1, wherein said plurality of holding cylinders are maintained in a rotatable carousel coupled to said indexer.

3. The launching device of claim 2, wherein said indexer is adapted to sequentially rotate said carousel to position one of said holding cylinder adjacent said outlet of said accumulation cylinder during each time said accumulation cylinder is reaching said given air pressure.

4. The launching device of claim 1, wherein said given air pressure is adjustable.

5. The launching device of claim 4, wherein said given air pressure is adjustable through said release valve assembly.

6. The launching device of claim 1, wherein said accumulating cylinder includes an air release bore and said release valve assembly includes a first piston for closing said outlet and a second piston for closing said air release bore.

7. The launching device of claim 6, wherein said first piston includes an annular compliant foam ring surrounding said first piston and positioned radially inward of an O-ring.

8. The launching device of claim 6, wherein when air pressure within said accumulation cylinder reaches ½0th of said given air pressure said release valve closes said air outlet.

9. A launching device for mock birds comprising:
 a plurality of holding cylinders retained in a rotatable carousel, each holding cylinder adapted to releasably retain a mock bird;
 an air valve adapted to be coupled to a source of pressurized air and actuable in response to an actuation signal;
 an accumulation cylinder having an inlet coupled to said air valve and an outlet adapted to be in communication with one of said holding cylinders proximal said accumulation cylinder reaching a given amount of air pressure, said accumulation cylinder having a release valve assembly permitting accumulation of air within said accumulation cylinder and the release of the accumulated air from within said accumulation cylinder through said outlet into one of said holding cylinders upon said accumulation cylinder reaching said given amount of air pressure to eject the mock bird from the one of said holding cylinders;
 an indexer coupled to said accumulation cylinder and said carousel and adapted to sequentially position one of said holding cylinders adjacent said outlet of said accumulation cylinder; and
 wherein said accumulation cylinder is adapted to move axially upward while said accumulation cylinder is filling with pressurized air and said indexer is adapted to move axially upward and translate its axially upward motion into rotational motion to rotate said carousel such that one of said holding cylinders is axially above said accumulation cylinder.

10. The launching device of claim 9, wherein said carousel includes a top plate having a plurality of holes at least corresponding in number to said plurality of holding cylinders, and a bottom plate having a plurality of holes axially aligned with and corresponding at least in number to said plurality of holes of said top plate, each said holding cylinder disposed in a pair of axially aligning holes of said top and bottom plates and limitedly axially movable therein.

11. The launching device of claim 10, wherein each holding cylinder is limited in axial movement by an upper O-ring and a lower O-ring.

12. The launching device of claim 9, further comprising a launch barrel positioned axially above said carousel and said accumulation cylinder.

13. The launching device of claim 9, wherein said given air pressure is adjustable.

14. The launching device of claim 13, wherein said given air pressure is adjustable through said release valve assembly.

15. The launching device of claim 9, wherein said accumulating cylinder includes an air release bore and said release valve assembly includes a first piston for closing said outlet and a second piston for closing said air release bore.

16. A method of sequentially launching a plurality of mock birds comprising the steps of:

provA plurality of holding cylinders retained in a rotatable carousel, each holding cylinder releasably retaining a mock bird;

providing an accumulation cylinder having an air inlet adapted to be coupled to a source of pressurized air, an air outlet, and a release valve assembly normally closing the air outlet, the accumulation cylinder adapted to be in communication with one of said holding cylinders with the release valve assembly releasing the accumulated pressurized air through said air outlet into the holding cylinder proximal said accumulation cylinder reaching a given air pressure;

providing an indexer coupled to said carousel and said accumulation cylinder, said indexer adapted to rotate said carousel and sequentially position one of said holding cylinders axially above said accumulation cylinder and said outlet of said accumulation cylinder proximal said accumulation cylinder reaching the given amount of air pressure;

providing an air valve coupled between the source of pressurized air and the air inlet of the accumulation cylinder, the air valve permitting pressurized air to flow to the accumulation cylinder upon receipt of an actuation signal; and wherein said accumulation cylinder moves axially upward upon receipt of pressurized air therein and said indexer translates its upward axial movement to rotational motion imparted to said carousel.

17. The method of claim 16, further comprising the steps of:

providing a transmitter adapted to generate an actuating signal; and providing a receiver coupled to the air valve and adapted to receive the actuating signal and generate the actuation signal.

* * * * *

UNITED STATES PATENT AND TRADEMARK OFFICE
CERTIFICATE OF CORRECTION

PATENT NO.      : 6,318,350 B1
DATED           : November 20, 2001
INVENTOR(S)     : Matthew R. Williams It is certified that error appears in the above-identified patent and that said Letters Patent is hereby corrected as shown below:

<u>Column 7,</u>
Line 4, delete "beer", and substitute -- been -- therefor.

<u>Column 8,</u>
Line 1, delete "614 9" and substitute -- 6-9 -- therefor.

Signed and Sealed this

Fourth Day of March, 2003

JAMES E. ROGAN
*Director of the United States Patent and Trademark Office*